United States Patent [19]

Lechner

[11] Patent Number: 4,911,194

[45] Date of Patent: Mar. 27, 1990

[54] THERMALLY-SENSITIVE COUPLING DEVICE

[75] Inventor: David M. Lechner, Lancaster, N.Y.

[73] Assignee: Harsco Corporation, Wormleysburg, Pa.

[21] Appl. No.: 425,757

[22] Filed: Oct. 23, 1989

[51] Int. Cl.[4] .............................................. F16K 17/40
[52] U.S. Cl. ........................................ 137/75; 137/79; 137/614.04; 285/1
[58] Field of Search ............... 137/72, 75, 79, 614.04; 251/149.4, 149.6; 285/1, 2, 3

[56] References Cited

U.S. PATENT DOCUMENTS

| | | | |
|---|---|---|---|
| 2,707,965 | 5/1955 | Allen | 137/75 |
| 3,245,423 | 4/1966 | Hansen et al. | 137/75 X |
| 3,532,101 | 10/1970 | Snyder | 137/75 |
| 3,690,336 | 9/1972 | Drum | 137/75 |
| 3,704,002 | 11/1972 | Skarzynski | 251/149.6 |
| 3,712,583 | 1/1973 | Martindale et al. | 251/149.6 |
| 4,280,523 | 7/1981 | Norton | 285/3 |
| 4,290,440 | 9/1981 | Sturgis | 137/75 |
| 4,638,975 | 1/1987 | Iuchi et al. | 251/149.6 |
| 4,825,893 | 5/1989 | Gailey | 137/75 |

*Primary Examiner*—John Rivell
*Attorney, Agent, or Firm*—Sommer, Oliverio & Sommer

[57] ABSTRACT

An improved coupling device (e.g., 134) has a first section (e.g., 135), a second section (e.g., 136), and a sleeve member (e.g., 138) mounted on one of the coupling sections and arranged to selectively engage the other coupling section. The sleeve member is provided with a weakened portion (e.g., 156). The weakened portion is formed of a suitable material and is so configured and arranged as to permit the two coupling sections to be physically separated from one another through thermally-induced flexural deformation of the weakened portion, without rotation of the sleeve member relative to either section, when the temperature of the weakened portion is greater than about 200° F. but less than about 300° F., and preferably about 266° F.

12 Claims, 2 Drawing Sheets

THERMALLY-SENSITIVE COUPLING DEVICE

TECHNICAL FIELD

The present invention relates generally to the field of coupling devices for joining two fluid-carrying conduits, electrical connectors or the like, and, more particularly, to an improved thermally-sensitive coupling device in which the joined coupling sections are adapted to separate automatically in the event that the temperature of a weakened portion of the coupling device exceeds a predetermined minimum temperature, with concomitant interruption of the fluid flow path or electrical circuit.

BACKGROUND OF THE INVENTION

Coupling devices are commonly used to releasably join fluid-carrying conduits and electrical connectors together. By the means of such coupling devices, the conduits or connectors may be separated and interrupted. Alternatively, they may be joined together by means of such coupling devices to establish a fluid-carrying path therethrough or to complete an electrical circuit. Such coupling devices may be of the "quick disconnect"-type, or may have a rotatable sleeve member mounted on one coupling section and adapted to engage the other.

Such coupling devices are, for example, typically used in fuel lines adapted to convey liquid petroleum gas (LPG) from a suitable source (e.g., a tank, container, or some other vessel) to a particular device or mechanism in which such gaseous fuel is to be consumed. This device might be an industrial lift-truck, a gas grill, or the like. In the case of the gas grill, there is an enhanced need for safety since such devices are commonly handled by consumers who may be less than careful at various times.

Accordingly, it would be generally desirable to provide an improved coupling device which affords the capability of releasably joining two fluid-carrying conduits or electrical connectors together in the usual manner, but which additionally provides for automatic separation of the coupling sections, with concomitant interruption in the fluid supply or electrical circuit therebetween, in the event that the temperature of a weakened portion of the coupling device exceeds a predetermined minimum temperature. One example of such a prior art coupling device is shown and described in U.S. Pat. No. 4,290,440.

DISCLOSURE OF THE INVENTION

The present invention provides an improved thermally-sensitive coupling device (e.g., 134), which broadly comprises: an elongated first section (e.g., 135); an elongated second section (e.g., 136); and a sleeve member (e.g., 138) rotatably mounted on one of the coupling sections and arranged to engage the other of the coupling sections for releasably holding the two sections together in axially-aligned relation to one another. The sleeve member has a weakened portion (e.g., 156) formed of a suitable material (e.g., a suitable thermoplastic) and is so configured and arranged as to permit the two coupling sections to be axially separated from one another, without rotational of the sleeve member relative to either section, through flexural deformation of the weakened portion when the temperature of the weakened portion is above a predetermined minimum temperature.

In the preferred embodiment, the first and second coupling sections are formed of brass, as in the prior art. However, the sleeve member is formed of a suitable thermoplastic material, such as a flame-retardant glass-filled polypropylene. The weakened portion is provided by means of an annular groove (e.g., defined by surfaces 153–155) extending into the cup-shaped sleeve member from its transversely-extending bottomsurface (e.g., 148). If desired, either or both of the coupling sections may be provided with self-closing check valves which are severally arranged to automatically close the passageway through the associated coupling section, upon separation. Moreover, the two coupling sections may be biased to move away from one another such that, upon thermally-induced flexural deformation of the weakened portion, the two coupling sections will move away from one another automatically.

Accordingly, the general object of this invention is to provide an improved coupling device.

Another object is to provide an improved thermally-sensitive coupling device in which two coupling sections are biased to move away from one another automatically when the temperature of a portion of the coupling device exceeds a predetermined minimum temperature.

Another object is to provide an improved thermally-sensitive fluid coupling device having self-closing means for preventing leakage or spillage in the event of thermally-induced separation of the coupling sections.

These and other objects and advantages will become apparent from the foregoing and ongoing written specification, the drawings, and the appended claims.

MODE(S) OF CARRYING OUT THE INVENTION

Figure 1:
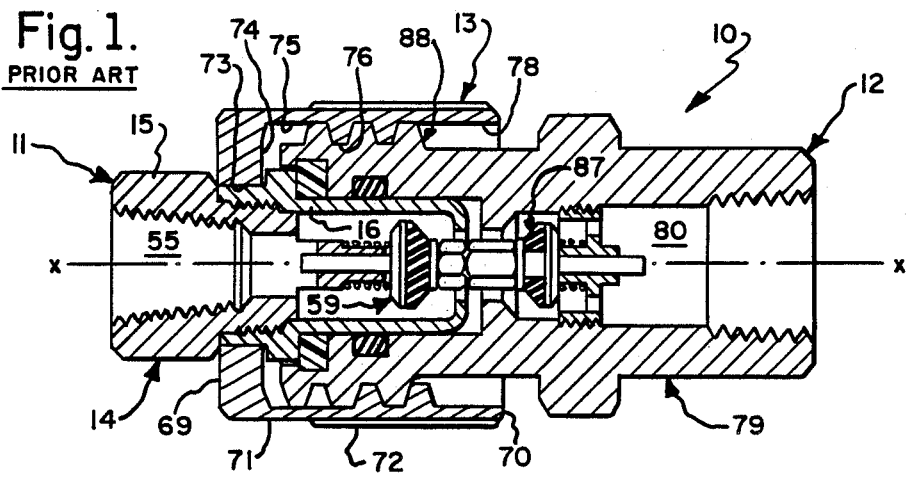
FIG. 1 is a longitudinal vertical sectional view of a prior art all-brass coupling device showing the first and second sections as being operatively joined together by the encircling sleeve member, and showing the first and second check valves as being in their opened positions so as to permit fluid flow through the communicating first and second passageways.

At the outset, it should be clearly understood that like reference numerals are intended to identify the same structural elements, portions or surfaces consistently throughout the several drawing figures, as such elements, portions or surfaces may be further described or explained by the entire written specification of which this detailed description is an integral part. Unless otherwise indicated, the drawings are intended to be read (e.g., arrangement of parts, mounting, proportion, degree, etc.) together with the specification and are to be considered a portion of the entire written description of this invention. As used in the following description, the terms "horizontal", "vertical", "left", "right", "up" and "down", as well as adjectival and adverbial derivatives thereof (e.g., "horizontally", "rightwardly", "upwardly", etc.) simply refer to the orientation of the illustrated structure as the particular drawing figure faces the reader. Unless otherwise indicated, the terms "inwardly" and "outwardly" refer to the orientation of a surface relative to is axis of elongation, or axis of rotation, as appropriate.

The present invention broadly provides an improved thermally-sensitive coupling device for releasably joining two coupling sections and for permitting such sections to separate automatically from one another when the flexure stresses in a thermally-weakened portion of the improved device exceed the yield point, at such elevated temperature, of the material of which the weakened portion is formed. However, because certain parts of the improved coupling device are taken from an earlier prior art coupling device, it is deemed advisable to first review the structure and operation of such prior art coupling in order that the structural and functional differences between the improved and prior art forms may be understood in context.

Prior Art Fluid Coupling Device (FIG. 1)

Referring now to FIG. 1, a prior art fluid coupling device, generally indicated at 10, is shown as broadly including a leftward first section 11 and a rightward second section 12. These two sections are shown as being releasably joined together by means of an encircling sleeve member 13. The coupling device is shown as being horizontally elongated along axis x—x.

More particularly, the leftward first section 11 is depicted as including an assembled two-piece body, collectively indicated at 14, having a left part 15 and a right part 16. Since body 14 is common to the improved form as well, the reader's attention is now directed to FIG. 4 for an enlarged illustration of these two body parts. The body left part 15 is shown as being a horizontally-elongated spcially-configured cast-and-machined member formed of brass. Body left part 15 has an annular vertical left end face 18, an annular vertical right end face 19, and an outer surface which sequentially includes, in pertinent part: a hexagonal surface 20 extending rightwardly from left end face 18, a rightwardly-facing annular vertical surface 21, an externally-threaded portion 22, a rightwardly-facing annular vertical surface 23, a cylindrical surface 24, a pair of rightwardly-facing upper and lower planar surfaces 25,26, a pair of upper and lower horizontal planar surfaces 28,29, a rightwardly-facing annular vertical surface 30, and a cylindrical surface 31 continuing rightwardly therefrom to join right end face 19. Surfaces 25,28 and 26,29 may be formed by milling transverse parallel slots through body part 15. The body left part is shown as also including a stepped axial through-bore which is sequentially bounded by: an inwardly- and rightwardly-tapered internally-threaded portion 32 extending rightwardly from left end face 18, a cylindrical surface 33, a leftwardly- and inwardly-facing frusto-conical surface 34, a cylindrical surface 35 extending rightwardly therefrom and intersecting surfaces 25,28 and 26,29, a leftwardly-facing annular vertical surface 36, and a cylindrical surface 38 continuing rightwardly therefrom to join right end face 19.

Figure 4:
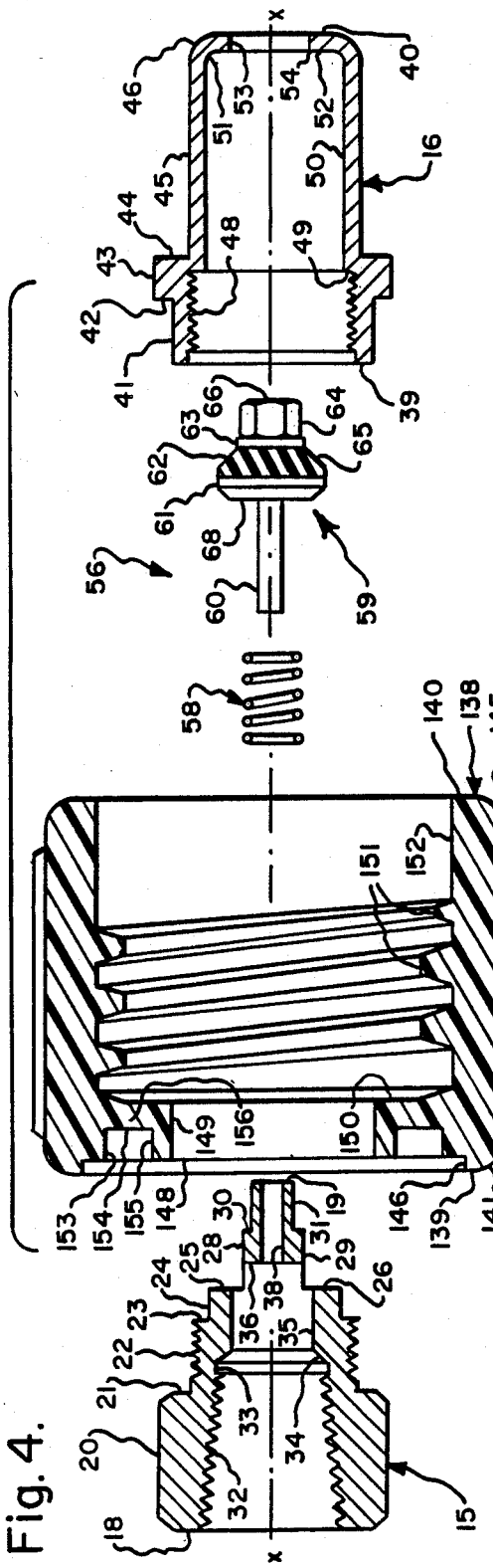
FIG. 4 is an exploded longitudinal vertical sectional view of the improved coupling first section.

Still referring principally to FIG. 4, the body right part 16 is shown as also being a horizontally-elongated specially-configured member. More particularly, right part 16 has an annular vertical left end face 39, an annular vertical right end face 40, and an outer surface which sequentially includes: a cylindrical surface 41 extending rightwardly from left end face 39, a leftwardly-facing annular vertical surface 42, a hexagonal surface 43, a rightwardly-facing annular vertical surface 44, a cylindrical surface 45, and a quarter-round annular convex surface 46 continuing rightwardly therefrom to join right end face 40. The right part is provided with a stepped axial through-bore which sequentially includes: an internally-threaded portion 48 extending rightwardly from left end face 39, a leftwardly-facing annular vertical surface 49, a cylindrical surface 50, a quarter-round annular concave surface 51 generally parallel to outer surface 46, a leftwardly-facing annular vertical surface 52, and a cylindrical surface 53 continuing rightwardly therefrom to join right end face 40. Thus, the body right part appears to be a tubular member having an in-turned radially-extending right marginal end portion, with the circular edge between surfaces 52,53 forming a leftwardly-facing seat 54. Alternatively, the body right part could be provided with a leftwardly- and inwardly-facing frusto-conical seat surface, as opposed to a sharpened edge. In any event, body right part 16 is adapted to be threaded on to body left part 15, as shown in FIG. 1, with threaded portions 22,48 being in meshed engagement, and with surfaces 21,39 abutting one another. The assembled body has a flow passage, generally indicated at 55, therethrough (FIG. 1). More particularly, this flow passage is generally defined within left part surfaces 32–36 and 38, and within the annular space defined between left part surfaces 25, 28–31 and 19 and right part surfaces 50–53.

A first check valve, generally indicated at 56 (FIG. 1), is operatively mounted on the first section body for movement between an open flow-permitting position (FIG. 1) and a closed flow-preventing position (not shown) to control the flow of fluid through first passageway 55. As best shown in FIG. 4, check valve 56 includes a coil spring 58 and a valve element subassembly, generally indicated at 59, which is mounted on the body for movement toward and away from seat 54. Valve element 59 has a leftwardly-extending horizontally-elongated cylindrical stem 60, a radially-extending large diameter flange 61 fixed to the stem, a resilient cushion 62, a flat washer 63 slidably mounted on the stem, and a nut 64 threaded on to the right marginal end portion of the stem. Thus, nut 64 may be selectively tightened on to the stem to compress cushion 62 between flange 61 and washer 63. Cushion 62 has an outwardly- and rightwardly-facing frusto-conical surface 65 arranged to face toward, and selectively engage, seat 54, and nut 64 has an annular vertical right end face 66. Adverting now to FIG. 1, stem 60 is slidably arranged within body bore surface 38. Spring 58 is compressed, and acts between rightwardly-facing body surface 30 and the leftwardly-facing annular vertical surface 68 of valve element flange 61. Since this flange is fixed to the stem for movement therewith, the coil spring biases the entire valve element to move rightwardly toward the seat.

Still referring to FIG. 1, in the prior art embodiment, outer sleeve member 13 is a cup-shaped member also formed of brass. The sleeve member has an annular vertical left end face 69, an annular vertical right end face 70, and an outer surface which sequentially includes: a cylindrical surface 71 extending rightwardly from left end face 69 and a knurled portion 72 continuing rightwardly therefrom to join right end face 70. The sleeve member also has a stepped inner surface which sequentially includes: a cylindrical surface 73 extending rightwardly from left end face 69, a rightwardly-facing annular vertical surface 74, a cylindrical surface 75, an internally-threaded portion 76, and a cylindrical surface 78 continuing rightwardly therefrom to join right end face 70. The marginal portion of the sleeve member about bottom through-hole 73 was loosely received in the outwardly-facing annular groove defined by body surfaces 21,41,42. Thus, the sleeve member was freely rotatably mounted on the first coupling section, but was restrained against axial movement relative thereto. Sleeve member internally-threaded portion 76 was adapted to matingly engage the second section threaded portion, as described infra.

Figure 5:
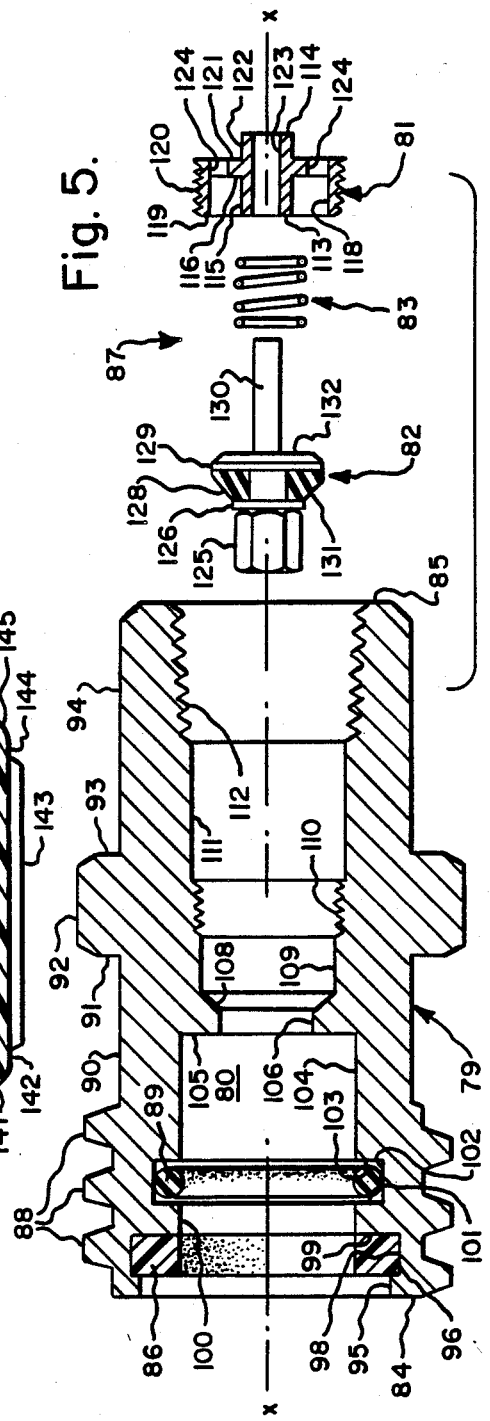
FIG. 5 is an exploded longitudinal vertical sectional view of the improved coupling second section.

The rightward second section 12 is shown as including a unitary one-piece body 79 having a second flow passageway, generally indicated at 80, extending axially therethrough; an insert 81; and a valve element 82 and coil spring 83 forming a second check valve 87. These four elements are shown in exploded aligned relation in FIG. 5.

The second section body 79 is shown as being a horizontally-elongated specially-configured cast-and machined member having an annular vertical left end face 84, an annular vertical right end face 85, and an outer surface which sequentially includes: an externally-threaded portion 88 extending rightwardly from left end face 84 and adapted to mate with sleeve member threads 76, a cylindrical surface 90, a leftwardly-facing annular vertical surface 91, a hexagonal surface 92, a rightwardly-facing annular vertical surface 93, and a cylindrical surface 94 continuing rightwardly therefrom to join right end face 85. The second body has an axial through-bore, forming passageway 80, which bore sequentially includes: a cylindrical surface 95 extending rightwardly from left end face 84, a rightwardly-facing annular vertical surface 96, a cylindrical surface 98, a leftwardly-facing annular vertical surface 99, a cylindrical surface 100, a rightwardly-facing annular vertical surface 101, a cylindrical surface 102, a leftwardly-facing annular vertical surface 103, a cylindrical surface 104, a leftwardly-facing annular vertical surface 105, a cylindrical surface 106, a rightwardly- and inwardly-facing frusto-conical surface 108, a cylindrical surface 109, an internally-threaded portion 110, a cylindrical surface 111, and a rightwardly- and outwardly-tapered internally-threaded portion 112 continuing rightwardly therefrom to join right end face 85. A resilient first seal ring 86 is shown arranged in the leftwardly-facing annular corner recess defined by surfaces 98,99, and a conventional O-Ring 89 is arranged in the inwardly-facing annular groove defined by surface 101,102,103. These two seal rings are adapted to slidably engage first section body surfaces 44,45 and 45, respectively, when the coupling sections are joined together to insure a fluid-tight connection therebetween. Second body 79 was also formed of brass.

Insert 81 is a horizontally-elongated specially-configured member having an annular vertical left end face 113, an annular vertical right end face 114, and an outer surface which sequentially includes: an outwardly-facing cylindrical surface 115 extending rightwardly from left end face 113, a leftwardly-facing annular vertical surface 116, an inwardly-facing cylindrical surface 118 extending leftwardly therefrom, a leftwardly-facing annular vertical surface 119, an outermost externally-threaded portion 120, a rightwardly-facing annular vertical surface 121, and an outwardly-facing cylindrical surface 122 continuing rightwardly therefrom to join right end face 114. An axial through-bore, bounded by cylindrical surface 123, communicates the left and right end faces of the insert. Thus, the insert somewhat resembles a wheel with a plurality of circularly-shaped holes, severally indicated at 124, being provided through the intermediate annular flange portion between the innermost or central hub portion and outermost rim portion. Holes 124 severally communicate surfaces 116,121.

Valve element 82 is substantially a mirror image of valve element 59, and specifically includes a nut 125 (albeit of greater axial length than nut 64), a washer 126, a resilient cushion 128, and a flange 129 mounted fast to a rightwardly-extending cylindrical rod-like stem 130 for movement therewith. Cushion 128 has a leftwardly- and outwardly-facing frusto-conical surface 131 arranged to move toward and away from seat surface 108. If desired, this seat could be a sharpened edge, as in the first section, or vice versa. The second section is assembled as shown in FIG. 1, with insert threads 120 in mating engagement with body threads 110, with valve element stem 130 slidably received within insert bore surface 123, and with coil spring 83 arranged to act between the annular vertical right face 132 of flange 129 and insert surface 116. Spring 83 is compressed, and continuously urges the valve element to move leftwardly into fluid-tight sealed engagement with seat 108.

As previously noted, the prior art coupling device shown in FIG. 1 was formed entirely of brass. This material was selected because it is relatively easy to machine, and is non-sparking. This latter feature was particularly desirable if the serviced fluid is flammable, such as LPG. In any event, when the first and second coupling sections are physically separated from one another, the expansion of springs 58,83 and any fluid pressure within the connected passageway, will cause valve elements 59,82 to automatically engage their associated seats to prevent fluid from leaking from the now-communicating interrupted fluid passages, and to also prevent contaminants from entering the fluid passageways. However, when the two coupling sections were initially brought axially together, the exposed end faces of nuts 64,125 would first abut one another. Then, as the two sections were moved axially further toward one another, valve elements 59,82 would be displaced off their respective seats to permit flow through the non-communicating passageways provided in the individual coupling sections. After first section surface 25 engaged the left face of second section seal member 86, outer sleeve member 13 could be threaded into engagement with the second section threaded portion 88 to releasably hold the two sections in coupled communication, with the two check valves being displaced to their flow-permitting positions. During separation, the foregoing sequence was reversed.

This prior art coupling device is manufactured by Sherwood, a division of Harsco Corporation (the assignee of the present application), is further identified by Sherwood Part Nos. 1425AM and 1425F, and is widely in use. However, since it is of all-brass construction, it does not deliberately permit separation when heated to a temperature at which the flexure stresses in the portion between surfaces 69,74 are less than the thermally-weakened yield point of brass. Moreover, assuming that it was heated uniformly, the thin-walled portion between sleeve surfaces 71,75 would experience axial strain or creep (i.e., elongation), as opposed to flexure or bending.

The Improved Coupling Device

Figure 2:
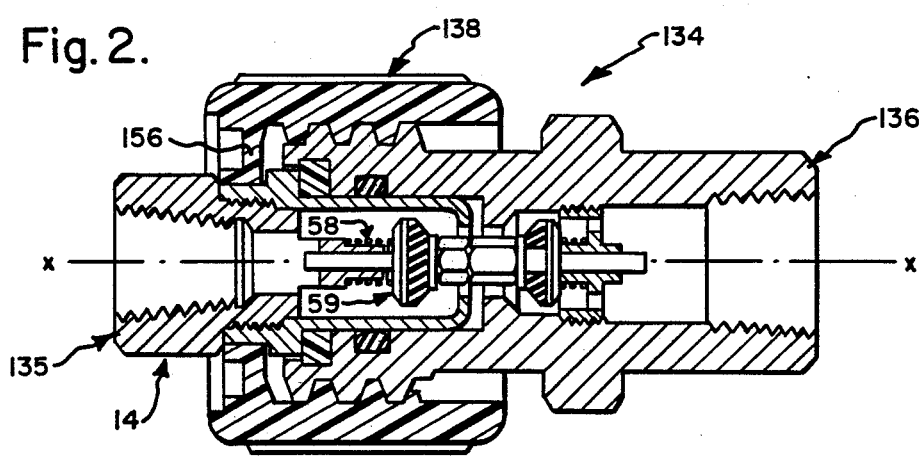
FIG. 2 is a longitudinal vertical sectional view of the improved coupling device showing the first and second sections as being operatively joined together by the improved sleeve member, this view showing the weakened portion of the sleeve member and further showing the first and second check valves as being opened to permit fluid flow through the communicating first and second passageways.
Figure 3:
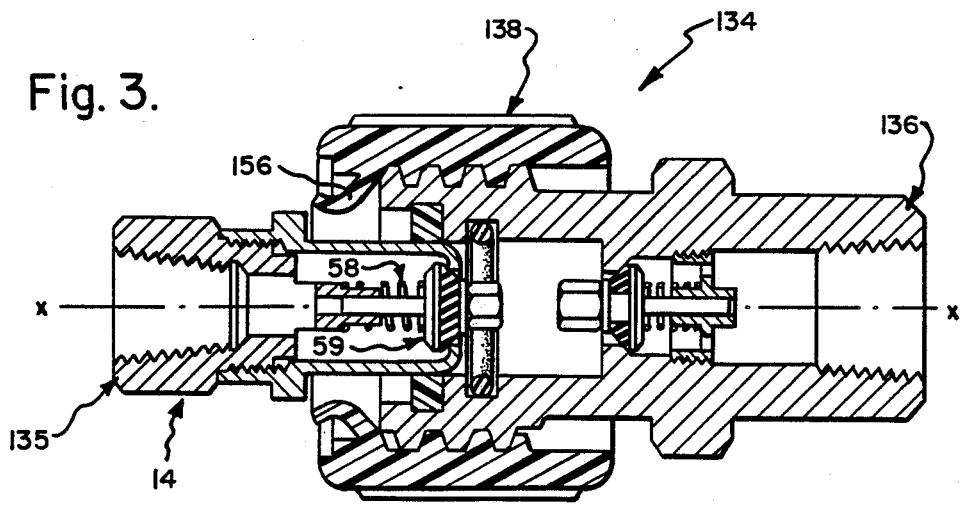
FIG. 3 is a view of the improved coupling device generally similar to FIG. 2, but showing the weakened portion of the sleeve member as having been flexibly deformed when the temperature of the weakened portion exceeds a predetermined minimum temperature, and further showing the two coupling sections as having moved away from one another with accompanying closure of the first and second check valves.

Referring now to FIGS. 2-3, the improved coupling device, generally indicated at 134, contains many of the structural elements heretofore described. Specifically, the leftward or first coupling section 135 contains two-piece body 14, valve element 59 and spring 58, all as previously described. The second section 136 is identical to the second section of the prior art embodiment, just described. In fact, the only significant difference between the improved coupling device and the prior art coupling device, is that sleeve member 138 has been substituted for sleeve member 13.

Whereas the prior art sleeve member 13 is formed entirely of brass, the improved sleeve member 138 is formed of a suitable thermoplastic material having a deflection temperature under load (i.e., at 264 psi) of about 280° F. For example, the sleeve member may be formed of RTP 105 CC FR, manufactured by RTP Co., Winona, Minn. 55987. In addition, the structure of the improved sleeve member differs from that of sleeve member 13.

As best shown in FIG. 4, the improved sleeve member 138 is depicted as being a horizontally-elongated cup-shaped member having an annular vertical left end face 139, an annular vertical right end face 140, and an outer surface which sequentially includes: a quarter-round convex annular surface 141 joining the left end face, a cylindrical surface 142, a knurled portion 143, a cylindrical surface 144, and a quarter-round convex annular surface 145 joining right end face 140. A large diameter shallow recess extends into sleeve member 138 from its left end face. This recess is bounded by cylindrical surface 146 extending into the sleeve member from left end face 139, and a leftwardly-facing annular vertical recess bottom surface 148. Sleeve member 138 also has a stepped axial through-bore which is sequentially bounded by: a cylindrical surface 149 extending rightwardly from surface 148, a rightwardly-facing annular vertical surface 150, an internally-threaded portion 151 adapted to mate with second section threaded portion 88, and a cylindrical surface 152 continuing rightwardly therefrom to join right end face 140. Moreover, an annular recess extends further into the sleeve member from the shallow recess. This second recess is bounded by inwardly-facing cylindrical surface 153 extending rightwardly into the sleeve member from first recess bottom surface 148, a leftwardly-facing annular vertical second recess bottom surface 154, and an outwardly-facing cylindrical surface 155 extending leftwardly therefrom to rejoin surface 148. Thus, this second annular recess forms with the sleeve member surface 150, an integrally-formed annular weakened portion 156. The radially-inward marginal end portion of this weakened portion is captured within the outwardly-facing annular groove (i.e., defined by surfaces 21,41,42 on the first section), while the radially-outward end of the weakened portion is integral with the sleeve member and is coupled to the second section via mating threaded portions 151,88. Thus, the separating forces created by compressed springs 58,83, and any fluid pressure within the coupled passageways, create flexure stresses in the annular weakened portion when the coupling sections are joined together. Hence, when the temperature of the weakened portion exceeds the thermally-weakened yield point of the material of which the weakened portion is formed (e.g., between about 200° F. and 300° F. for a suitable thermoplastic material), the weakened portion will be bow or flex, as shown in FIG. 3, thereby allowing the two sections to separate from one another automatically. As previously described, the individual check valves in the two coupling sections will automatically close their associated passageways upon such separation of the sections.

Therefore, the present invention broadly provides an improved thermally-sensitive coupling device (e.g., 134), which broadly includes an elongated first section (e.g., 135); an elongated second section (e.g., 136); and a sleeve member (e.g., 138) mounted on one of the sections and arranged to engage the other of the sections for releasably holding the sections together in axially-aligned relation to one another. The sleeve member has a weakened portion (e.g., 156), is formed of a suitable material, and is so configured and arranged as to permit the two sections to be physically separated from one another, without rotation of the sleeve member relative to either section, through thermally-induced flexural deformation of the weakened portion when the temperature of the weakened portion is greater than about 200° F. but less than about 300° F., and preferably about 266° F., this latter temperature being required by a code.

Modifications

The present invention contemplates that many changes and modifications may be made. For example, in the preferred embodiment, all parts, except for sleeve member 138, are again formed of brass, principally because of its non-sparking qualities. The sleeve member itself may be formed integrally of a sutiable thermoplastic material. Alternatively, if the serviced fluid(s) permit, the coupling sections and/or the sleeve member could be made of other materials, such as polyvinylchloride, polycarbonate, glass-filled nylon or the like. Moreover, the weakened portion of the sleeve member need not necessarily be formed integrally with the entire sleeve member. If desired, the weakened portion could be formed as a separate element, and subsequently assembled to the sleeve member. Other techniques exist in the prior art for concentrating the stresses at the point of maximum flexural stress. The shut-off check valves may be eliminated, if desired.

Moreover, the invention is not limited to use with a fluid coupling-device. In certain applications, such a coupling device might be used to releasably connect two electrical conductors, or the like. Hence, the principles of the present invention can readily be applied to such alternative uses as well.

Therefore, while the presently-preferred form of the improved thermally-sensitive coupling device has been shown and described, and several modifications and changes thereof discussed, persons skilled in this art will readily appreciate that various additional changes and modifications may be made without departing from the spirit of the invention, as defined and differentiated by the following claims.

What is claimed is:

1. A thermally-sensitive coupling device, comprising: an elongated first section; an elongated second section; and a sleeve member rotatably mounted on one of said sections and arranged to engage the other of said sections for releasably holding said sections together in axially-aligned relation to one another, said sleeve member having a weakened portion formed of a suitable material and being so configured and arranged as to permit said sections to be physically separated from one another, without rotation of said sleeve member relative to either section, through flexural deformation of said weakened portion when the temperature of said weakened portion is greater than about 200° F. but less than about 300° F.

2. A thermally-sensitive coupling device as set forth in claim 1 wherein said flexural deformation occurs above about 200° F.

3. A thermally-sensitive coupling device as set forth in claim 2 wherein said flexural deformation occurs at less than about 266° F.

4. A thermally-sensitive coupling device as set forth in claim 1 wherein said weakened portion is formed of a thermoplastic material.

5. A thermally-sensitive coupling device as set forth in claim 1 wherein said sections are biased to separate from one another.

6. A thermally-sensitive coupling device as set forth in claim 1 wherein said sleeve member is cup-shaped and has a base portion and a side wall portion, wherein an axial hole is provided through said base portion, wherein said one section is provided with an annular groove, and wherein the marginal portion of said base portion about said hole is received in said groove so as to permit said sleeve member to rotate freely relative to said one coupling section.

7. A thermally-sensitive coupling device as set forth in claim 6 wherein said weakened portion is such annular base portion.

8. A thermally-sensitive coupling device as set forth in claim 6 wherein said base and side wall portions are formed integrally.

9. A thermally-sensitive coupling device as set forth in claim 1 wherein said weakened portion is annular.

10. A thermally-sensitive coupling device as set forth in claim 1 wherein said first section has a first fluid passage therethrough, and further comprising a first check valve mounted on said first coupling section and arranged to automatically open said first fluid passage when said sections are joined together and to automatically close said first fluid passage when said sections are separated from one another.

11. A thermally-sensitive coupling device as set forth in claim 1 wherein said second section has a second fluid passage therethrough, and furhter comprising a second check valve mounted on said second coupling section and arranged to automatically open said second fluid passage when said coupling sections are joined together and to automatically close said second fluid passage when said sections are separated from one another.

12. A thermally-sensitive coupling device as set forth in claim 1 wherein said first and second sections are formed of brass.

* * * * *